No. 743,698. PATENTED NOV. 10, 1903.
H. DOWNER.
ATTACHMENT FOR CULTIVATING IMPLEMENTS.
APPLICATION FILED APR. 23, 1903.
NO MODEL.

Witnesses
H. Downer, Inventor
Attorneys

No. 743,698.

Patented November 10, 1903.

UNITED STATES PATENT OFFICE.

HUNTINGTON DOWNER, OF GRANTS PASS, OREGON.

ATTACHMENT FOR CULTIVATING IMPLEMENTS.

SPECIFICATION forming part of Letters Patent No. 743,698, dated November 10, 1903.

Application filed April 23, 1903. Serial No. 154,018. (No model.)

*To all whom it may concern:*

Be it known that I, HUNTINGTON DOWNER, a citizen of the United States, residing at Grants Pass, in the county of Josephine and State of Oregon, have invented a new and useful Attachment for Cultivating Implements, of which the following is a specification.

This invention relates to an improved attachment for harrows and other agricultural implements of a like nature, the same consisting of a device whereby the implement to which it is attached may be conveniently steered on level ground or retained in the line of draft upon a hillside, as circumstances may require.

In the cultivation of orchards no little difficulty has been experienced in cultivating sufficiently close to the trees, especially young trees, without serious danger of injuring the trees with the cultivating implement, which is usually a harrow, often of the spring-tooth pattern. The usual way of overcoming this difficulty is to cultivate each row in a double zigzag line and afterward cultivating between the rows. This has consumed much time, and the operation has not always been as effective and successful as might be desired. Likewise in cultivating on hillsides—such as, for instance, in vineyards—there has been a constant tendency for the cultivating implement to slip down the hillside, which tendency has usually been counteracted only by directing the draft-animals upwardly. This method of overcoming the difficulty has of course not met with much success, owing to the presence of the vines on the hillside.

By my present invention, which is applicable to a variety of agricultural implements—such as harrows, cultivators, floats, &c., except disk harrows—I provide the implement with a steering-disk engaging the soil and mounted upon a vertical shaft or axle having a handle whereby it may be manipulated by the operator in the desired direction, whether it be on a hillside or upon the level ground, the object in the latter case being to enable the implement to be swerved to either side of the team, thus enabling the implement to be held close to its work without any necessity whatever of keeping it in the tracks of the team.

My invention consists in the improved construction, arrangement, and combination of parts, which will be hereinafter fully described, and particularly pointed out in the claims.

Figure 1:
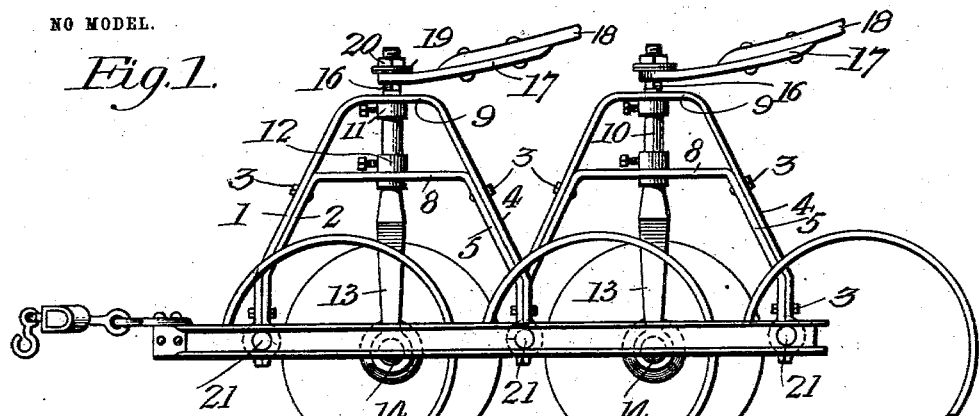
Figure 2:
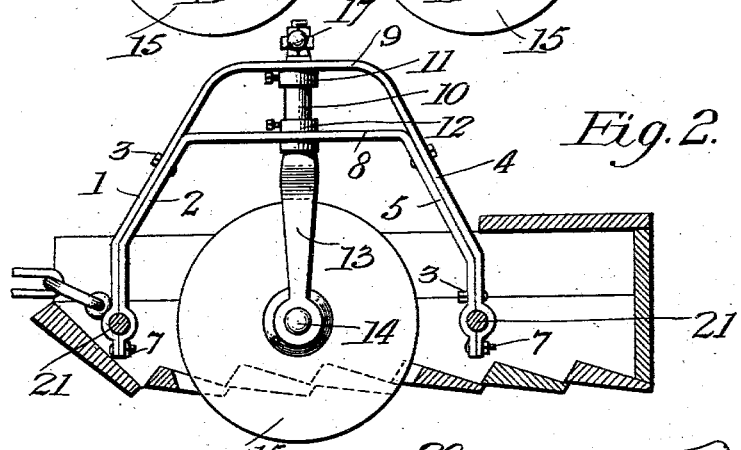
Figure 3:
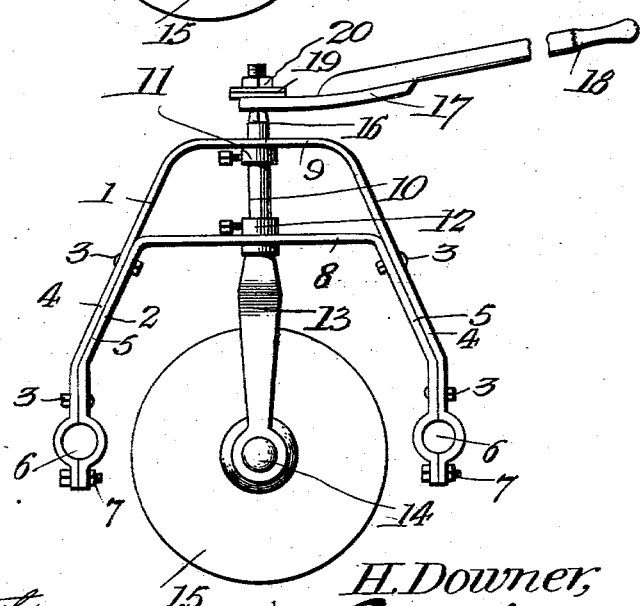

In the drawings, Figure 1 is a side elevation of a spring-harrow to which a pair of my improved devices have been attached. Fig. 2 is a sectional view of a float having my improved steering attachment. Fig. 3 is a side elevation of my improved steering device.

Corresponding parts in the several figures are indicated by similar numerals of reference.

In the construction of my improved device I avail myself of a frame composed of two yokes 1 and 2, the outer one of which, 1, receives between its legs the legs of the inner yoke 2, which are connected detachably with the legs of the outer yoke by means of bolts and nuts, as 3, or other suitable connecting means. The lower ends of the legs 4 and 5 of the outer and inner yokes, respectively, are bent to form clips 6, the free ends of which are connected by tightening-bolts 7.

The top piece 8 of the inner yoke 2 is longer than the top piece 9 of the outer yoke 1, thus leaving an open space between the said top pieces or cross-pieces. Said top or cross pieces are provided with bearings for a vertical shaft or shank 10, which is retained in position vertically adjustably by means of set-collars 11 and 12, which are disposed adjacent to the upper and under sides of the cross-pieces 8 and 9, respectively.

The lower end of the shaft or shank 10 is bifurcated, as shown at 13, the members of the bifurcated portion of the shank affording bearings at their lower ends for a short spindle or axle 14, carrying a disk or colter 15. The upper end of the shaft or shank has a square or non-circular portion 16, upon which is fitted a handle-bar 17, which may be all iron or which for the sake of lightness may be provided with a wooden extension 18. Above this square or non-circular portion the shaft 10 is rounded and threaded to receive a washer 19 and a fastening-nut 20.

In operation the frame of my improved attachment is mounted upon suitable cross-bars 21 of the implement with which it is to be used by means of the clips 6 and tightening-bolts. Additional bracing means may be used within the scope of my invention to maintain the frame in upright position. If the implement is a riding one, the handle 18 is extended within reach of the driver. If it is a walking one, said handle is extended sufficiently in a rearward direction to bring it within reach of the driver, who walks in the wake of the implement.

Within the scope of my invention two of my improved attachments may be used in connection with a single implement, in which event they are disposed fore and aft with relation to such implement. In this case it is obvious that two handles are provided, by means of which the shafts carrying the disks, which may be designated "rudder-disks," may be independently manipulated to guide the implement in the desired direction.

It will be obvious that by the use of my invention the implement to which the device is attached may be guided in any desired direction. I have found by practical test that an implement equipped with two disks may on level ground be kept entirely clear of the tracks of the draft-animals, while on a hillside the implement may be kept as closely as may be desired to the vines or growing plants without the least necessity for urging the team in an upward direction upon the hillside.

I have in the foregoing described a simple and preferred construction of my improved device; but I desire it to be understood that I do not limit myself with regard to the structural details of the same, but reserve the right to any changes, alterations, and modifications which may be resorted to within the scope of my invention and without departing from the spirit or sacrificing the utility of the same.

Having thus described my invention, I claim—

1. In a device of the class described, a frame composed of a pair of suitably-connected yokes, the cross-pieces of which are unequal in length, clips formed upon the legs of said yokes, connecting-bolts for said clips, a shank journaled in the cross-bars of the yokes, and a rudder-disk revolubly connected with said shank.

2. In a device of the class described, a pair of yokes suitably connected, a shank journaled in the cross-bars of said yokes, set-collars upon said shank adjacent to said cross-bars, supporting means for the frame formed by said yokes, a rudder-disk mounted revolubly at the lower end of the shank, and means for turning the latter in its bearings.

3. The herein-described attachment for cultivating implements, the same consisting of a frame comprising a pair of yokes suitably connected, clips formed upon the legs of said yokes, a shaft journaled in the cross-bars of said shaft being bifurcated at its lower end, a rudder-disk journaled between the members of the bifurcated portion of the shaft, means for securing the latter against vertical displacement, and a handle upon said shaft.

4. The combination with a cultivating implement having cross-bars, of a revoluble rudder-disk, supporting means for the same engaging said cross-bars, and means for adjusting said rudder-disk to guide the implement with which it is connected.

In testimony that I claim the foregoing as my own I have hereto affixed my signature in the presence of two witnesses.

HUNTINGTON DOWNER.

Witnesses:
R. L. BARTLETT,
T. P. JUDSON.